United States Patent Office 3,364,259
Patented Jan. 16, 1968

3,364,259
PREPARATION OF TRIMESOYL CHLORIDE
Joseph J. Scigliano, Sacramento, Herman H. Weyland, Folsom, and Edward E. Hamel, Citrus Heights, Calif., assignors to Aerojet-General Corporation, Azusa, Calif., a corporation of Ohio
No Drawing. Filed Jan. 17, 1964, Ser. No. 338,523
4 Claims. (Cl. 260—544)

This invention relates to a novel and improved process for the preparation of tris(N-1',2'-butylene)trimesamide.

The previous methods for the preparation of tris(N-1',2'-butylene)trimesamide have not produced the compound in the degree of purity required for many applications of this compound, such as in the curing of solid rocket propellants. Further, previous methods for the preparation of this compound have been excessively costly. Accordingly, it is an object of this invention to provide a novel method for the preparation of tris(N-1',2'-butylene)trimesamide. Still another object of this invention is to prepare tris(N-1',2'-butylene)trimesamide in greater purity and at lower costs. These and other objects of this invention will be apparent from the detailed description which follows.

The process for preparing tris(N-1',2'-butylene)trimesamide of this invention involves the following reaction steps.

(I)
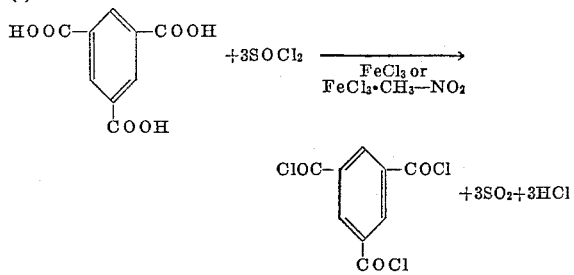

(II)
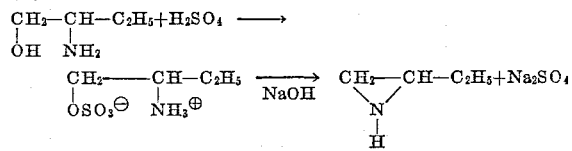

(III)
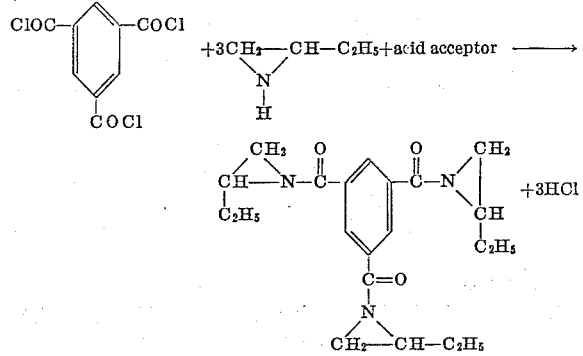

As can be seen from the foregoing equations, the reaction steps of the process of this invention are, first, the conversion of trimesic acid to trimesoyl chloride using thionyl chloride in the presence of ferric chloride or ferric chloride-nitromethane complex as the catalyst. In Reaction II, butylene amine is prepared by the cyclization of the sulfate ester of 2-amino-1-butanol in a caustic medium. In Reaction III above, the trimesoyl chloride and the butylene imine, prepared as in Reactions I and II re-spectively, are then reacted in a bi-phase system comprising water and methylene dichloride in the presence of an acid acceptor to form the desired tris(N-1',2'-butylene) trimesamide. The preferred acid acceptors for this reaction are potassium carbonate, potassium hydroxide, and sodium hydroxide. The most preferred acid acceptor is potassium carbonate.

In Reaction I, the use of thionyl chloride is an essential part of the process since its use provides high conversions of the acid to the acid chloride, and is superior from the standpoint of ease of handling compared to other agents such as phosphorous pentachloride. Likewise, the use of ferric chloride or ferric chloride-nitromethane complex as the catalyst for the reaction is critical to the production of the acid chloride in high yield and within a reasonable short reaction time. Thus, when other catalysts such as pyridine are used, the reaction rate is too slow even when greater than catalytic quantities are used. Further, the acid chloride produced when pyridine is used as the catalyst is difficult to purify and gives a product containing unreacted trimesic acid and pyridine salts. Various other amine and Lewis acid catalysts such as boron trifluoride etherate, piperidine, titanium tetrachloride, stannic chloride, and aluminum trichloride give slow rates of reaction and are unsuited for use in the process of this invention.

The amount of ferric trichloride-nitromethane complex used can vary from 0.1 to 1.5 weight percent based on the weight of the trimesic acid starting material. In general, a catalyst concentration on the order of 0.20 to 0.25 weight percent has been found to give substantially complete conversion in a reasonable period of time. Addition of the catalyst may be facilitated by first dissolving it in a small amount of water. Normally, the trimesic acid and thionyl chloride are employed in about stoichiometric amounts up to about 10 mole percent excess of the thionyl chloride. Preferably a slight excess of the thionyl chloride is used. This excess serves as a solvent for the reaction. However, inert solvents, such as the chlorinated solvents (carbon tetrachloride methylene dichloride, etc.) can be used. The reaction temperature may be varied over a wide range. However, best results are obtained when the temperature is maintained within the range of from about 78° C. to about 105° C.

The reaction time required varies depending upon the catalyst level, agitation and rate of heating. In general, best results are obtained when a 0.22 weight percent catalyst level with vigorous agitation and rapid heating are employed. Reaction I occurs quite rapidly and will go to completion in time periods ranging from 0.3 to about 4 hours. The trimesoyl chloride produced may, if desired, be purified by conventional means such as by distillation. However, for use in Reaction III, it is not necessary that the trimesoyl chloride be purified since it has been found that the filtered crude trimesoyl chloride, stripped free of volatiles such as $SO_2$ and HCl, can be utilized directly in Reaction III.

As can be seen above, Reaction II involves, first, the conversion of the 2-amino-1-butanol to the sulfate ester by reaction with sulfuric acid, preferably concentrated sulfuric acid (95–99 percent by weight), followed by the cyclization of the ester to butylene imine in the presence of sodium hydroxide. The reaction temperature employed in the sulfate ester step depends upon the vehicle used. Temperature ranges from about 100° C. to about 155° C. are found to be most suitable. In general, the reactants may be employed in about stoichiometric amounts up to about 3 to 5 mole precent excess of the concentrated sulfuric acid.

The preparation of the sulfate ester is preferably, although not necessarily, carried out in the presence of an inert carrier, such as cumene, acetylene tetrachloride, 1,4-dichlorobutane, chlorobenzene or ethylene dibromide. Ethylene dibromide is the preferred vehicle because of its excellent ability to separate from water. Thus, at the end of the reaction of the 2-amino-1-butanol and the sulfuric acid, the ethylene dibromide containing the sulfate ester is mixed with water. The sulfate ester readily dissolves in the water phase. The aqueous phase is readily recovered and ready for treatment with the sodium hydroxide.

The conversion of the sulfate ester to the butylene imine is normally carried out under atmospheric pressure at a temperature from about 90° C. to 100° C., with the sodium hydroxide being employed in a stoichiometric amount or a slight excess.

In Reaction III, the trimesoyl chloride and the butylene imine are reacted in a bi-phase system in the presence of an acid acceptor. The bi-phase system of the present invention comprises water and methylene dichloride, the ratio of water to methylene dichloride varying from 1.6 to 3.6 parts water per 1 part methylene dichloride. Preferably the water is used in an amount which is 2.6 times that the amount of methylene dichloride used. The use of a bi-phase system has been found to substantially improve the purity of the tris(N-1',2'-butylene)trimesamide as evidenced by high product assay. Thus, the bi-phase system of this invention consistently provides the desired compound having an assay of 65 up to 90 percent. In contrast, thereto, a mono-phase system employing methylene chloride provides a product having an assay of only 43.5 percent.

The above reaction may be carried out in the presence of a wide variety of acid acceptors such as triethylamine, potassium carbonate, potassium hydroxide and sodium hydroxide. The preferred acid acceptor is potassium carbonate. Reaction III is carried out at a temperature of from about −15° C. to about +25° C., and more preferably at a temperature from −10° C. to about +10° C., and still more preferably from 0° C. to +5° C. The reactants can be employed from about stoichiometric amounts (3 moles of butylene imine per mole of trimesoyl chloride) up to an excess of butylene imine corresponding to about 6 moles of imine per mole of the acid chloride. The best results are obtained when 4 moles of imine are employed per mole of the acid chloride.

*Example I.—Preparation of trimesoyl chloride*

In an agitated 50 gal. glass-lined Pfaudler reactor, solid trimesic acid (0.466 lb. mole) and thionyl chloride (1.69 lb. mole) were mixed. An aqueous solution of $FeCl_3$ (1.77 g. $FeCl_3 \cdot 6H_2O$ and 60 ml. $H_2O$) was added in increments over a period of an hour. The reaction mass was rapidly heated and vigorously agitated to initiate gas evolution. While the temperature of the reaction mass slowly rose to 105 to 110° C., the generated gases (sulfur dioxide and hydrogen chloride) were vented to a caustic scrubber. When the reaction subsided, as indicated by the rise in temperature to 110° C., the system was evacuated to remove volatiles ($SO_2$, HCl, and $SOCl_2$) and maintained at 96° C. under 28 inches of vacuum for four hours. Potentiometric titration with 1 N NaOH was used to determine the degree of conversion to the acid chloride. When the titration indicated complete conversion (96–100 percent), methylene chloride 3.2/1 weight ratio of methylene chloride to acid chloride) was added to dissolve the acid chloride. It was found that the methylene chloride solution of the trimesoyl chloride could be stored for extended periods without deterioration.

*Example II.—Preparation of butylene imine*

To a 100 gal. glass-lined reactor containing an agitated mixture of concentrated sulfuric acid was slowly added an ethylene dibromide solution of 2-amino-1-butanol (0.45 lb. mole) while allowing the temperature to rise from 25° C. to 65° C. After the addition, the reaction mass was heated to 130° C. and the water of reaction was collected. When the rate of water evolution decreased to 0.50 to 0.75 ml./min., the reaction mass was cooled below 100° C. and tap water (30 gal.) was added to dissolve the sulfate ester. The mixture was stirred and allowed to separate in two phases. The lower (ethylene dibromide) phase was separated and the upper (aqueous) phase containing the product was transferred to an agitated 70 gal. stainless steel vessel for distillation from a caustic medium. The kettle was heated and the butylene imine water distillate (175 lbs.), boiling at 96 to 100° C., was collected in a receiver. When the distillation was complete, the butylene imine concentration of the contents of the receiver was determined by aqueous HCl titration and index of refraction. The yield of butylene imine was 94 precent.

*Example III.—Preparation of tris(N-1',2'-butylene)trimesamide*

The butylene imine (0.72 lb. mole, 100 percent basis) water solution was charged to a 100 gal. stainless steel reactor followed by the addition of the potassium carbonate (0.72 lb. mole). Once the carbonate had dissolved, the temperature was lowered and maintained at 0 to +5° C. while the trimesoyl chloride-methylene chloride solution (0.18 lb. mole, 100 percent basis) was added over a 1 hour period. Stirring was continued for an additional hour after which time the heterogeneous mixture was allowed to separate. The upper (aqueous) phase (pH 9.0 to 9.5) was siphoned off. The lower, organic, phase was washed twice with 12 gal. of 0.4 percent caustic solution for three minutes and allowed to separate into two layers. After each washing the upper phase was siphoned off. After the caustic washings, two water washings were carried out using 12 gal. of water per wash. The lower organic phase was dried by adding a thin stream of sodium sulfate (10 lbs.) with agitation to prevent caking. The stirring was continued for 30 minutes after the addition and the slurry was then filtered into a 100 gal. glass-lined tank. The tris(N-1',2'-butylene)trimesamide solution was then concentrated by continuously feeding the filtered solution to a 50 gal. glass-lined reactor maintained under vacuum. The concentration step was discontinued when the volume of the concentrate was approximately 9 to 10 gal. The concentrate was then finally dried for 12 hours at 15 to 21° C. and 28 inches of vacuum. The tris(N-1',2'-butylene)trimesamide was then transferred to a 30-gal. drum and stored. The assay was 84.06 percent.

The tris (N-1',2'-butylene)trimesamide prepared according to the process of this invention may be employed for a variety of purposes. For example, this compound can be used to cross-link polymers containing pendant carboxy group. Illustrative of such polymers are polyacrylic acid, polymethacrylic acid, and copolymers and terpolymers of acrylic or methacrylic acid. The compound prepared by this invention may also be used as a curing agent in a solid rocket propellant containing a carboxy-terminated polymeric binder material. The resultant propellants possess excellent physical properties and thermal stability.

Having fully described our invention, it is intended that it be limited only by the lawful scope of the appended claims.

We claim:

1. The method of preparing trimesoyl chloride which comprises reacting trimesic acid with thionyl chloride in the presence of from about 0.1 to about 1.5 weight percent based on the weight of the trimesic acid, of a catalyst selected from the group consisting of ferric trichloride and ferric trichloride-nitromethane complex.

2. The method of preparing trimesoyl chloride which comprises reacting trimesic acid with thionyl chloride, said thionyl chloride being employed in an amount from about stoichiometric up to about 10 mole percent excess, in the presence of from about 0.20 to about 0.25 weight percent based on the weight of the trimesic acid, of a catalyst selected from the group consisting of ferric trichloride and ferric trichloride-nitromethane complex.

3. The method of preparing trimesoyl chloride which comprises reacting trimesic acid with thionyl chloride, said thionyl chloride being employed in an amount from about stoichiometric up to about 10 mole percent excess, in the presence of from about 0.20 to about 0.25 weight percent based on the weight of the trimesic acid, of a catalyst selected from the group consisting of ferric trichloride and ferric trichloride-nitromethane complex, said reaction being carried out at a temperature of from about 78° C. to about 105° C.

4. The method of preparing trimesoyl chloride which comprises reacting trimesic acid with thionyl chloride, said thionyl chloride being employed in an amount from about stoichiometric up to about 10 mole percent excess, in the presence of about 0.22 weight percent based on the weight of the trimesic acid, of a catalyst selected from the group consisting of ferric trichloride and ferric trichloride-nitromethane complex, said reaction being carried out at a temperature of from about 78° C. to about 105° C.

References Cited

UNITED STATES PATENTS

| 3,115,474 | 12/1963 | Smith | 260—239 |
| 3,115,490 | 12/1963 | Smith | 260—239 |
| 3,133,950 | 5/1964 | Pizzarello et al. | 260—239 |

FOREIGN PATENTS

| 460,888 | 2/1937 | Great Britain. |

ALTON D. ROLLINS, *Primary Examiner.*

C. D. QUARFORTH, *Examiner.*

L. A. SEBASTIAN, *Assistant Examiner.*